United States Patent [19]

Kurtz

[11] Patent Number: 4,842,007

[45] Date of Patent: Jun. 27, 1989

[54] SELF-SEALING VALVE FOR INFLATED BODIES

[75] Inventor: Richard J. Kurtz, Arvada, Colo.

[73] Assignee: Guard Associates, Inc., Denver, Colo.

[21] Appl. No.: 241,464

[22] Filed: Sep. 8, 1988

[51] Int. Cl.[4] .................. F16K 15/20; A63H 27/10
[52] U.S. Cl. .................. 137/223; 137/246; 137/846; 446/220; 446/224
[58] Field of Search ............ 137/223, 246, 843, 846; 446/220, 224

[56] References Cited

U.S. PATENT DOCUMENTS

| | | | |
|---|---|---|---|
| 563,287 | 7/1896 | Lane et al. | 446/224 |
| 1,008,641 | 11/1911 | Gregory | 446/224 |
| 1,151,093 | 8/1915 | DuBois | 446/220 |
| 1,413,978 | 4/1922 | Franklin | 446/224 |
| 1,702,974 | 2/1929 | MacDonald | 137/846 |
| 2,597,924 | 5/1952 | Davenport et al. | 450/38 |
| 2,674,064 | 4/1954 | Gassaway | 446/224 |
| 2,864,201 | 12/1958 | Leise | 446/220 X |
| 3,088,242 | 5/1963 | Rockovits | 446/220 |
| 3,799,427 | 3/1974 | Goglio | 137/246 X |
| 4,431,161 | 2/1984 | Miller et al. | 137/246 X |
| 4,444,219 | 4/1984 | Hollenstein | 137/246 |
| 4,758,198 | 7/1988 | Ishiwa | 137/846 X |

Primary Examiner—John Rivell
Attorney, Agent, or Firm—Fields, Lewis, Pittenger & Rost

[57] ABSTRACT

A valve for an inflatable body has the inside of a valve member within the body having opposed wall portions normally superposed on one another and movable upon forcible separation. The inside of the opposed wall portions are coated with a viscid, non-hardening material preferably a polyglycol which minimizes leakage of helium and a like gas through the valve when the body is inflated.

10 Claims, 1 Drawing Sheet

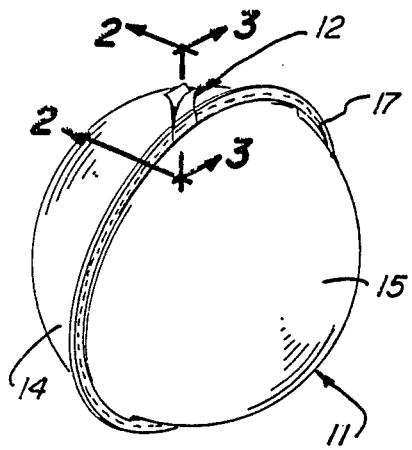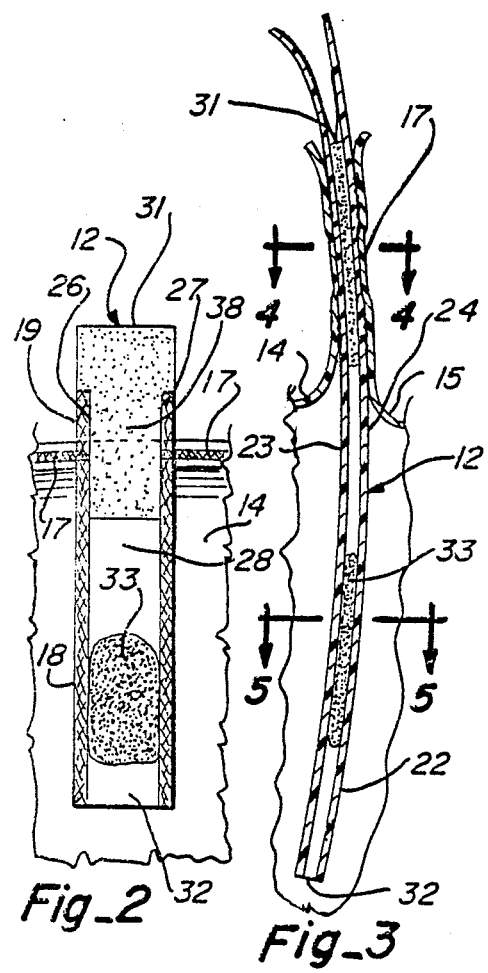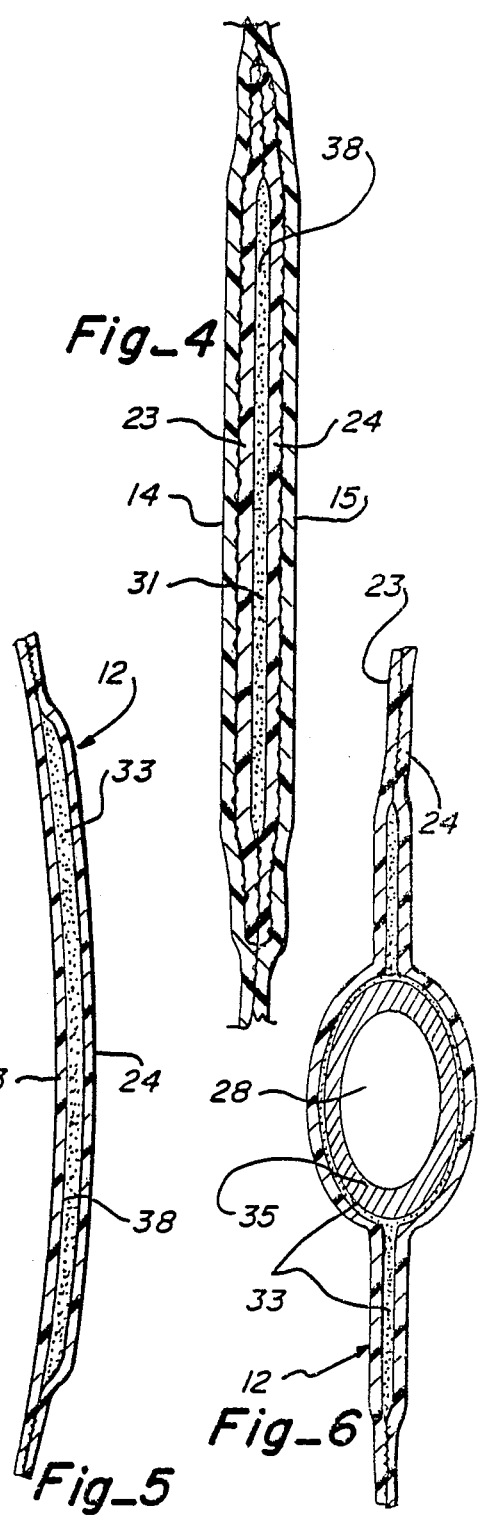

SELF-SEALING VALVE FOR INFLATED BODIES

TECHNICAL FIELD

This invention relates to a novel and improved self-sealing valve for an inflated body and is particularly suitable for lighter-than-air balloons containing helium or the like.

BACKGROUND ART

Currently, there are a number of techniques used to seal the valves in inflatable bodies. The most common technique in lighter-than-air helium filled balloons is to use a valve that relies on the internal pressure of the inflated body and the molecular attraction of certain plastic film materials to achieve a seal.

Gregory U.S. Pat. No. 1,008,641 discloses a self-sealing valve in a balloon comprising a generally flat tube extending through and sealed to the wall of the balloon with the sides of the flat tube remaining in contact to form a seal except when they are forcibly separated.

Davenport U.S. Pat. No. 2,597,924 discloses a self-sealing valve in a bladder comprising a pair of layers of plastic sheet material which relies on the internal plastic and the molecular adhesion of the material to form the seal. While these prior attempts have been successful to some degree, they still allow an unacceptably high rate of leakage particularly when used with lighter than air gases such as helium which gas tends to leak through microscopic openings.

DISCLOSURE OF THE INVENTION

A self-sealing valve for an inflatable body is disclosed. The valve disclosed includes a self-sealing valve member which extends through and is sealed to inner wall portions of an inflatable body. The valve member has opposed wall portions normally superposed on one another so that the wall portions can be forcibly separated to provide a flow passage through the valve member. The inside of the wall portions are provided with a coating of a viscid, non-hardening material, preferably a polypropylene glycol which material will flow into any microscopic openings along the flow passage to prevent an exiting gas flow from the body.

DESCRIPTION OF THE DRAWINGS

The details of this invention will be described in connection with the accompanying drawings in which:

FIG. 1 is a perspective view of an inflated body having a self-sealed valve embodying features of the present invention;

FIG. 2 is a sectional view taken along line 2—2 of FIG. 1 showing a plan view of the valve in the inflated body;

FIG. 3 is an enlarged sectional view taken along lines 3—3 of FIG. 1;

FIG. 4 is an enlarged sectional view taken along lines 4—4 of FIG. 3;

FIG. 5 is an enlarged sectional view taken along lines 5—5 of FIG. 3;

FIG. 6 is an enlarged sectional view taken along the same lines as in FIG. 5 showing the valve in an opened position.

DETAILED DESCRIPTION

Referring now to FIG. 1, there is shown an inflated body 11 in the form of an inflated balloon with a self-sealing valve 12 according to the present invention. The inflatable body 11 shown is made of two identically shaped, circular, flexible panel members 14 and 15 preferably of a flexible, plastic sheet material that is impervious to gas flow therethrough. The panel members are joined, preferably by heat seaming along and inwardly of the marginal edge at a seam 17. The valve 12 extends through the seam 17 so that an inner valve portion 18 is inside the inflated body and an outer valve portion 19 is outside the inflated body.

The valve 12 is comprised of two relatively long and narrow, generally rectangular, flexible sheet members 23 and 24, made preferably of a gas-impervious plastic film or gas-impervious sheet material superposed one on another. The films are selected to provide a relatively large degree of rigidity and have a tendency to return to the flat condition as well as having a high degree of molecular attraction for themselves. A preferred material is a low density polyethylene/nylon/low density polyethylene laminate, although satisfactory results have also been achieved with other materials including polyurethane and low density polyethylene materials.

The sheet members 23 and 24 are best sealed together along two substantially parallel spaced seams 26 and 27. This provides opposed wall portions inside the seams that define a flow passage 28 through the valve when the wall portions are forcibly separated so that a gas will flow between a fill feed end 31 and a fill discharge end 32.

A coating 33 is placed between the two sheet members 23 and 24 at inner valve portion 18 inside the body to seal the valve against leakage. This coating, preferably is a viscid, non-hardening sealing composition. A composition found suitable is essentially a polyglycol which is viscid at room temperatures. The composition consists essentially of:

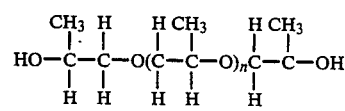

where n varies from 5 to 67 and having an average molecular weight from 400 to 4000. The composition that was found to be particularly effective is identified as polyglycol P2000, has an n of 32, and an average molecular weight of 2000.

In the assembly of the valve member into the balloon, this is done prior to making the balloon. The two panels 14 and 15 are placed or superposed one on another and the valve 12 is inserted in place. A release coating 38 of a suitable material is provided between the two sheet members at the outer portion 19. The thickness of the release coating 38 is greatly exaggerated in thickness in the drawing for purposes of illustration. A preferred practice is to use a silicon ink and print same on the film. This printed coating is the full width of the two sheets along an outer end portion outside the balloon and seams 26 and 27 terminate a selective distance short of the outr extremities so in plan the pattern of the film is somewhat T-shaped being wider at the outer end and narrower along the seams. The seam 17 is then formed using conventional heat sealing equipment. The release coating 38 does not allow the seal to traverse and seal the valve members together so that the flow passage 28 may be established. In use, a rigid tubular member 35 is inserted through the valve to form flow passage 28 and a pressurized gas such as helium is introduced via the valve into the body 11. When the tubular member 35 is removed, the opposed wall portions of the sheet members 23 and 24 come together and coating 33 will tend to flow into any microscopic openings between the opposed wall portions and along the seams 26 and 27 to prevent an exiting gas flow through the body 11 when the body is inflated. This has been found to be particularly effective in minimizing leakage of helium and light gases in helium inflated balloons.

Although the present invention has been described with a certain degree of particularity, it is understood that the present disclosure has been made by way of example and that changes in details of structure may be made without departing from the spirit thereof.

What is claimed is:

1. A self-sealing valve for an inflatable body comprising:
   a valve member having opposed wall portions coated inside with a layer of viscid, non-hardening sealing composition consisting essentially of a polyglycol which is a viscous liquid at substantially room temperature to seal said wall portions together to minimize exiting gas flow through said valve member when an inflatable body to which the valve is mounted is inflated, said wall portions being movable upon forcible separation to provide a gas flow passage for inflation and deflation of said inflatable body.

2. A self-sealing valve as set forth in claim 1 wherein said composition consists essentially of polypropylene glycol.

3. A self-sealing valve for an inflatable body as set forth in claim 1 wherein said composition consists essentially of:

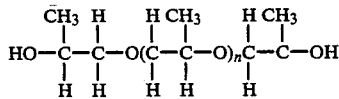

where n varies from 5 to 67 and having an average molecular weight of from 400 to 4000.

4. A valve as set forth in claim 3 wherein n is about 32 and the average molecular weight is about 2000.

5. A valve as set forth in claim 1 wherein said tubular valve member is made of two generally flat sheets of material having a substantially identical generally rectangular configuration.

6. A valve as set forth in claim 1 wherein said valve member is a laminate of low density polyethylene, nylon and a low density polyethylene.

7. A valve as set forth in claim 1 wherein said valve member is made of two generally rectangular flexible sheet members of a gas-impervious film superposed on one another having two substantially parallel spaced seams forming a flow passage when said two sheet members are forcibly separated through which a gas will pass.

8. A self-sealing valve for an inflatable body comprising:
   a generally tubular valve member having opposed wall portions coated inside with a layer of viscid, non-hardening sealing composition consisting essentially of a polyglycol which is a viscous liquid at room temperature to seal said tubular member to minimize exiting gas flow through said valve member when an inflatable body to which the valve is mounted is inflated, said wall portions being movable upon forcible separation to provide a gas flow passage for inflation and deflation of said inflatable body.

9. A combination inflatable body and self-sealing valve comprising:
   an inflatable body including two panel members of a gas impervious sheet material joined along the marginal edges at a seam,
   a valve member extending through said seam and sealed to the panel members at said seam, said valve member including a pair of generally flat, flexible sheet members of gas-impervious plastic sheet material superposed on one another, a pair of laterally spaced, air-impervious seams extending along said sheet members and securing said members together with intermediate portions of said sheet members between said seams being unsecured to provide upon forcible separation a gas injection and gas ejection flow passage, said valve member having an outer end portion exteriorly of the body and inner end portion inside of said body, a portion of the contacting surfaces of said members between said seams having a coating of a layer of a viscid, non-hardening sealing composition consisting essentially of a polyglycol which is a viscous liquid at substantially room temperature to flow into any microscopic openings between said sheet members and along the seams to prevent an exiting gas flow through said passage when said body is inflated.

10. A self-sealing valve for an inflatable body comprising:
    a valve member having opposed wall portions coated inside with a layer of viscid, non-hardening sealing composition to seal said wall portions together to minimize exiting gas flow through said valve member when an inflatable body to which the valve is mounted is inflated, said wall portions being movable upon forcible separation to provide a gas flow passage for inflation and deflation of said inflatable boy, said valve member being sealed into a seam of the inflatable body formed by two panels of material joined at said seam, said valve member being coated inside with a release coating to prevent said wall portions from being sealed together so as to not inhibit gas flow through said gas flow passage.

* * * * *